United States Patent
Eriksson et al.

(10) Patent No.: US 10,660,308 B2
(45) Date of Patent: May 26, 2020

(54) SYSTEM AND METHOD FOR IMAGING AND PROCESSING ANIMAL DATA

(71) Applicant: DELAVAL HOLDING AB, Tumba (SE)

(72) Inventors: Göran Eriksson, Tumba (SE); Gösta Forsén, Tullinge (SE); Tommy Gunnarsson, Tumba (SE)

(73) Assignee: DeLaval Holding AB, Tumba (SE)

( * ) Notice: Subject to any disclaimer, the term of this patent is extended or adjusted under 35 U.S.C. 154(b) by 153 days.

(21) Appl. No.: 15/773,872

(22) PCT Filed: Nov. 3, 2016

(86) PCT No.: PCT/SE2016/051078
§ 371 (c)(1),
(2) Date: May 4, 2018

(87) PCT Pub. No.: WO2017/078600
PCT Pub. Date: May 11, 2017

(65) Prior Publication Data
US 2019/0069512 A1    Mar. 7, 2019

(30) Foreign Application Priority Data
Nov. 4, 2015   (SE) ........................................ 1551425
Jan. 29, 2016   (SE) ........................................ 1650117

(51) Int. Cl.
*A01K 11/00*    (2006.01)
*G06K 7/10*    (2006.01)
(Continued)

(52) U.S. Cl.
CPC ............ *A01K 11/006* (2013.01); *A01K 29/00* (2013.01); *A01K 29/005* (2013.01);
(Continued)

(58) Field of Classification Search
CPC ..... A01K 11/006; A01K 29/00; A01K 29/005; A01K 1/0613; G06K 7/10297;
(Continued)

(56) References Cited

U.S. PATENT DOCUMENTS

| 7,399,220 B2 | 7/2008 | Kriesel et al. |
| 8,488,844 B2 | 7/2013 | Springer et al. |

(Continued)

FOREIGN PATENT DOCUMENTS

| DE | 20 2007 012 558 U1 | 12/2007 |
| EP | 2 573 948 A1 | 3/2013 |

(Continued)

OTHER PUBLICATIONS

Swedish Search Report, dated Dec. 15, 2017, from corresponding Swedish Application No. 1650117-3.
(Continued)

*Primary Examiner* — Jianxun Yang
(74) *Attorney, Agent, or Firm* — Young & Thompson

(57) ABSTRACT

Within a view field, a camera records image data representing a body portion of an animal. A reader unit registers identity data from a data carrier on the animal and a data processor associates the recorded image data with the registered identity data. A passageway only allows a single animal at the time within the camera's view field. The camera is arranged so that the view field covers an identification zone within the passageway. To reduce the risk that the reader unit interferes with other nearby equipment, the data processor detects the presence of any animal within the view field of the camera based on the recorded image data, and activates the reader unit only when an animal is detected within the identification zone.

16 Claims, 1 Drawing Sheet

(51) Int. Cl.
*G06T 7/70* (2017.01)
*A01K 29/00* (2006.01)
*G06K 9/00* (2006.01)
*G06T 7/00* (2017.01)

(52) U.S. Cl.
CPC ..... *G06K 7/10009* (2013.01); *G06K 7/10128* (2013.01); *G06K 7/10297* (2013.01); *G06K 9/00362* (2013.01); *G06T 7/0012* (2013.01); *G06T 7/70* (2017.01)

(58) Field of Classification Search
CPC ..... G06K 9/00362; G06T 7/0012; G06T 7/70; G01G 9/005; G01G 17/08; G08B 13/248; G07C 9/00111
See application file for complete search history.

(56) References Cited

U.S. PATENT DOCUMENTS

| | | | |
|---|---|---|---|
| 9,684,956 | B2 | 6/2017 | Liao et al. |
| 9,762,295 | B2 | 9/2017 | Brandsma et al. |
| 2002/0108576 | A1 | 8/2002 | Lely et al. |
| 2012/0274442 | A1 | 11/2012 | Mottram |
| 2013/0063567 | A1* | 3/2013 | Burns .................. G08B 13/248 348/46 |
| 2014/0029808 | A1 | 1/2014 | Lee |
| 2014/0104036 | A1* | 4/2014 | Skonberg ............ G07C 9/00111 340/5.3 |
| 2014/0140582 | A1* | 5/2014 | Spicola, Jr. .......... A01K 29/005 382/110 |
| 2016/0295838 | A1 | 10/2016 | Van Der Kamp et al. |

FOREIGN PATENT DOCUMENTS

| | | |
|---|---|---|
| WO | 2007/064202 A1 | 6/2007 |
| WO | 2010/063527 A1 | 6/2010 |
| WO | 2011/046434 A1 | 4/2011 |
| WO | 2011/051693 A1 | 5/2011 |
| WO | 2015/088329 A1 | 6/2015 |

OTHER PUBLICATIONS

International-Type Search Report, dated May 13, 2016, from corresponding application No. 1551425-0.

International Search Report, dated Jan. 11, 2017, from corresponding PCT application No. PCT/SE2016/051078.

* cited by examiner

SYSTEM AND METHOD FOR IMAGING AND PROCESSING ANIMAL DATA

THE BACKGROUND OF THE INVENTION AND PRIOR ART

The present invention relates generally to data processing in connection with animal handling. More particularly the invention relates to a system according to the preamble of claim 1 and a corresponding method. The invention also relates to a computer program and a processor-readable medium.

The so-called body condition score (BCS) of a milking animal provides a reasonably accurate measure of the animal's energy reserves by reflecting the amount of body fat, and how this fat is distributed on the rear body of the animal. The BCS targets at key stages of lactation, and has been developed for dairy production systems. The BCS affects dry matter intake, milk production, reproduction, cow health and welfare. Especially, the BCS is an important factor in connection with dry-off. However, it is also important to keep track of the BCS during peak lactation and the period thereafter in order to feed the animal adequately. In addition, the BCS in early lactation may affect the sex of future calves and the productive and reproductive capacity of heifers yet to be born. Irrespective of the farming system or cow genetics, it has been found that milk production is optimized when mature cows calve between BCS 5.0 and 6.0. The production benefits decline with increasing BCS and the risk of metabolic health disorders at calving is greater, such that increasing BCS beyond 5.0 in mature cows and 5.5 in first and second calvers cannot be justified. Recommended calving BCS targets are a compromise between wanting cows with sufficient energy reserves for milk production, while not being so fat as to compromise cow health.

WO 2010/063527 discloses an arrangement for determining a BCS of an animal, which arrangement contains a three-dimensional (3D) camera system directed towards the animal and provided for recording at least one 3D image of the animal. An image processing device forms a 3D surface representation of a portion of the animal from the 3D image. The surface is statistically analysed for determining the BCS of the animal based on the statistically analysed surface of the 3D surface representation.

PROBLEMS ASSOCIATED WITH THE PRIOR ART

Although the existing systems for deriving BCS data may be efficient as such, there is still room for improvement. Specifically, if an independent provider of a BCS-data-collecting system wishes to co-locate their system with another provider's equipment, for instance an automatic milking arrangement, there is a risk that the two systems interfere with one another. Namely, on one hand, both systems are likely to operate in the same, or at least neighboring radio bands for exchanging data with radio transponders for identifying the animals; and, on the other hand, the two systems will not be coordinated with one another. This lack of coordination leads to a relatively high probability that radio energy emitted from one of the systems disturbs the radio communication in the other system, and vice versa. It is therefore generally problematic for systems from different providers to co-exist in the same area, such as a given farm environment.

SUMMARY OF THE INVENTION

Consequently, the object of the present invention is to mitigate the above problem, and offer a stand-alone solution for associating various image data with individual animals in a herd of animals.

According to one aspect of the invention, the object is achieved by the initially described system, wherein a passageway is configured to only allow a single animal at the time within the view field of the camera. The camera is arranged so that the view field covers an identification zone within the passageway. The data processor is configured to detect the presence of any animal within the view field of the camera based on the recorded image data. If and only if an animal is detected within the identification zone, the data processor is configured to generate a trigger signal configured to activate the reader unit.

The camera is preferably arranged in the exit passageway associated with a parlour, such as a rotary parlour. When the animals exit the parlour the have to pass the passageway in a particular direction through the view field. The passageway has a width at least in the area of the view filed which only allows one animal at a time to pass the view field.

According to another preferred embodiment the passageway has a gate configured to enable animals to pass in a particular direction thorugh the view filed. In this embodiment the camera is arranged so that the view field covers an identification zone within the passageway in the proximity to the gate. The gate is preferably a non-return gate, wherein the gate is configured to exclusively enable animals to pass in a particular direction thorugh the view field. This embodiment may be arranged anywhere within the barn that houses the animals. It is also possible to arrange this embodiment in a pasture.

This system is advantageous because it ensures that the reader unit is active exclusively when needed, i.e. when there is an animal within the camera's view field.

According to a preferred embodiment of this aspect of the invention, the data processor is configured to maintain the reader unit in an active state during a given interval after having generated the trigger signal. Preferably, the given interval is defined to end when: the identity data has been registered; a particular time has elapsed since the trigger signal was generated and/or the recorded image data reflects that the animal no longer is located within the identification zone, whichever occurs first. This is advantageous because it further reduces the risk of any unnecessary operation of the reader unit.

According to another preferred embodiment of this aspect of the invention, the reader unit contains a scanner configured to register the identity data from data carriers on the animals in the form of radio-frequency identification tags. Thus, the data carriers may be represented by conventional radio transponders. This, in turn, enables a straightforward implementation of the system in cooperation with existing systems, for instance for milking animals in order to effect body condition scoring.

According to a further preferred embodiment of this aspect of the invention, the recorded image data is presumed to represent a rear body portion of a milking animal and the data processor is specifically configured to derive a BCS measure based on the recorded image data. Hence, BCS data for a herd of cows can be readily collected via a system that is fully independent from any other systems in the farm environment.

According to another aspect of the invention, the object is achieved by the method described initially, wherein the method further involves registering the identity data when the animal is located within an identification zone of a passageway. The identification zone is configured to only allow a single animal at the time within the view field of the camera. The passageway also has a gate configured to enable animals to pass in a particular direction through the view field. The identification zone is located within the passageway in proximity to the gate. The method further involves detecting the presence of any animal within the view field of the camera, and generating a trigger signal for activating the reader unit if and only if an animal is detected within the identification zone. The advantages of this method, as well as the preferred embodiments thereof, are apparent from the discussion above with reference to the proposed system. The gate is preferably a non-return gate, wherein the gate is configured to exclusively enable animals to pass in a particular direction through the view field.

According to a further aspect of the invention the object is achieved by a computer program loadable into the memory of at least one processor, and includes software adapted to implement the method proposed above when said program is run on at least one processor.

According to another aspect of the invention the object is achieved by a processor-readable medium, having a program recorded thereon, where the program is to control at least one processor to perform the method proposed above when the program is loaded into the at least one processor.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
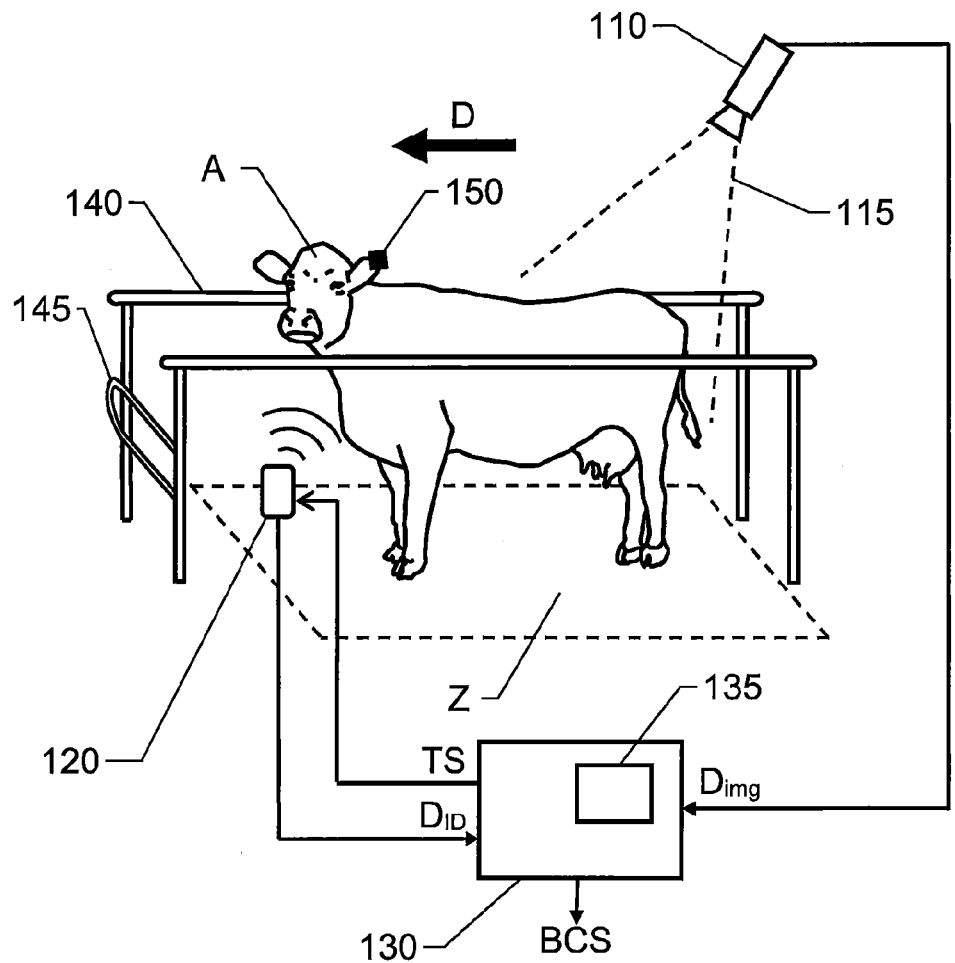
FIG. 1 shows a system according to one embodiment of the invention.

In FIG. 1, we see system for data processing according to one embodiment of the invention. The system contains a camera 110, a reader unit 120, a data processor 130 and a passageway 140.

The camera 110 is configured to record image data $D_{img}$ within a view field 115. The camera 110 is arranged with the view field 115 oriented in such a direction that the image data $D_{img}$ represents at least one specific body portion of any animal A located in an identification zone Z.

More precisely, the passageway 140 is positioned relative to the identification zone Z such that only a single animal A at the time is allowed within the view field 115 of the camera 110. The passageway 140 also has a non-return gate 145 that is configured to exclusively enable animals to pass in a particular direction D through the view field 115 and the identification zone Z. It is especially advantageous if the non-return gate 145 is of a type that is opened by the animal A by positioning its nose/front part of the head under the gate, and then pushes the gate slightly upwards while moving itself forwards. Namely, such a gate design forces the animal A to locate its head in a relatively well-defined space in order to pass through the identification zone Z.

The reader unit 120 is therefore preferably arranged as close as possible to said well-defined space because this allows a relatively short readout range—and thus low emission of energy there from. The reader unit 120 is configured to register identity data $D_{ID}$ from a data carrier 150, e.g. included in a transponder, on the animal A of which the camera 110 currently records the image data $D_{img}$. To this aim, the reader unit 120 may contain a scanner configured to register the identity data $D_{ID}$ from data carriers 150 in the form of radio-frequency identification tags.

However, alternative remote sensing technologies are also conceivable according to the invention, such as designs based inductive, ultrasonic or optic signals.

The camera 110 is arranged so that the identification zone Z defined within the passageway 140 is located in proximity to the non-return gate 145. For instance, the camera 110 and the non-return gate 145 may be arranged relative to the passageway 140 in such a manner that an animal A within the identification zone Z having the data carrier 150 attached to its ear will be positioned with its rear part closest to the camera 110 when the animal A lowers its head for opening the non-return gate 145.

The data processor 130 is configured to associate the recorded image data $D_{img}$ with the registered identity data $D_{ID}$. For example, the recorded image data $D_{img}$ may represent a rear body portion of a milking animal, and the data processor 130 may be configured to derive a BCS measure based on the recorded image data $D_{img}$. Thus, an individual BSC rating can be provided for each animal when passing through the passageway 140.

According to the invention, the data processor 130 is further configured to detect the presence of any animal A within the view field 115 of the camera 110 based on the recorded image data $D_{img}$. If, and only if, an animal A is thus detected within the identification zone Z, the data processor 130 is configured to generate a trigger signal TS, which, in turn, is configured to activate the reader unit 120. In other words, the reader unit 120 will exclusively be activated when an animal A that can be expected to have a data carrier 150 is found to be situated within the identification zone Z.

To further reduce the risk of unnecessary operation of the reader unit 120, the data processor 130 is preferably configured to maintain the reader unit 120 in an active state during a given interval after having generated the trigger signal TS. The data processor 130 is preferably configured to cause the given interval to end when the identity data $D_{ID}$ has been registered, when a particular time has elapsed since the trigger signal TS was generated; and/or when the recorded image data $D_{img}$ reflects that the animal A no longer is located within the identification zone Z, for instance, whichever occurs first. Thereby, the risk of interference from the proposed data processing system with any other remote-sensing system for registering identity data $D_{ID}$ can be kept very low.

It is generally advantageous if the data processor 130 is configured to associate the recorded image data $D_{img}$ with the registered identity data $D_{ID}$ in a fully automatic manner, for instance by an executing computer program. Therefore, the data processor 130 may be communicatively connected to a memory unit 135 storing a computer program product, which, in turn, contains software SW for making at least one processor in the data processor execute the above-described actions when the computer program product SW is run on the at least one processor.

Figure 2:
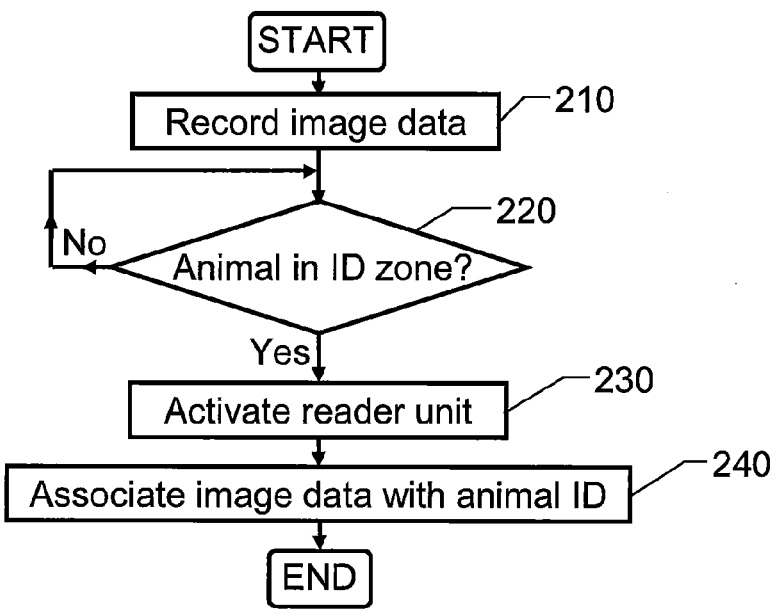
FIG. 2 illustrates, by means of a flow diagram, the general method according to the invention.

In order to sum up, and with reference to the flow diagram in FIG. 2, we will now describe the general method for processing data according to the invention.

In a first step 210, image data is recorded. In a subsequent step 220, it is checked if the recorded image data is deemed to represent an animal (e.g. a cow) located within an identification zone of a passageway. If so, a step 230 follows; and otherwise, the procedure loops back and stays in step 220.

In step 230, a trigger signal is generated, which trigger signal is configured to activate a reader unit. The trigger signal is generated if and only if an animal is detected within the identification zone, and the reader unit is configured to register identity data from a data carrier on the animal of which the camera records image data.

Then, in a step 240, the recorded image data associated with the registered identity data. For example, this may involve linking a BSC measure derived from the image data to a particular animal ID.

Thereafter, the procedure ends. However, the procedure only ends with respect to said particular associating of image data with identity data. In practice, of course, the procedure continues in order to produce further associations between image data and identity data with respect to other animals, and/or with respect to updated recordings of the same animal.

All of the process steps, as well as any sub-sequence of steps, described with reference to FIG. 2 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system for associating image data with one individual animal of plural animals, the system comprising:
 a camera (110) configured to record image data (Dimg) within a view field (115) of the camera (110), which image data (Dimg) represents at least one specific body portion of the one individual animal (A);
 a passageway (140) that includes an identification zone (Z), the camera (110) being arranged to have the view field (115) covering the identification zone (Z) in the passageway (140), the identification zone (Z) being configured to only allow a single animal (A) at the time in the identification zone (Z) within the view field (115) of the camera (110);
 a reader unit (120) configured to register identity data (DID) from a data carrier (150) on the single animal (A) in the identification zone (Z) within the view field (115) of the camera (110); and
 a data processor (130) operatively connected to the camera (110) to receive the image data (Dimg) of the single animal within the view field (115) of the camera (110), the data processor (130) being configured to
 i) detect, based on the received recorded image data (Dimg), a presence of the single animal (A) in the identification zone (Z) within the view field (115) of the camera (110),
 ii) upon detecting the presence of the single animal (A) based on the received recorded image data (Dimg), to generate a trigger signal (TS) that activates the reader unit (120) into an active state, the trigger signal (TS) being configured to activate the reader unit (120) to register the identity data (DID) from the data carrier (150) on the single animal (A) detected in the identification zone (Z),
 wherein the reader unit (120) is normally in an inactive state and is activated into the active state only by receiving the trigger signal thereby ensuring that the reader unit (120) is in the active state exclusively when the one individual animal is detected, from by the image data (Dimg), as being within the identification zone (Z),
 wherein the data processor (130) is configured to associate the recorded image data (Dimg) with the registered identity data (DID) of the one individual animal, and
 iii) maintain the reader unit (120) in the active state during a given time interval after having generated the trigger signal (TS), and to cause the given time interval to end and the reader unit returned to the inactive state when a set condition is satisfied, the set condition being at least one of
 the identity data (DID) having been registered,
 a particular time having elapsed since the trigger signal (TS) was generated, and
 the recorded image data (Dimg) reflecting that the one individual animal (A) no longer is located within the identification zone (Z).

2. The system according to claim 1, wherein the passageway has a gate (145) configured to enable the animals to pass in a particular direction (d) through the view field (115) and wherein the identification zone (z) is within the passageway (140) in proximity to the gate.

3. The system according to claim 1, wherein the set condition is the identity data (DID) having been registered, the identity data (DID) having been registered causing the data processor to end the given time interval and have the reader unit returned to the inactive state.

4. The system according to claim 1, wherein the set condition is the particular time having elapsed since the trigger signal (TS) was generated, the particular time having elapsed since the trigger signal (TS) was generated causing the data processor to end the given time interval and have the reader unit returned to the inactive state.

5. The system according to claim 1, wherein the reader unit (120) comprises a scanner configured to register the identity data (DID) from data carriers (150) in the form of radio-frequency identification tags.

6. The system according to claim 1, wherein the recorded image data (Dimg) represents a rear body portion of a milking animal and the data processor (130) is configured to derive a body condition score (BCS) based on the recorded image data (Dimg).

7. The system according to claim 1, wherein the set condition is the recorded image data (Dimg) reflecting that the one individual animal (A) no longer is located within the identification zone (Z), the recorded image data (Dimg) reflecting that the one individual animal (A) no longer is located within the identification zone (Z) causing the data processor to end the given time interval and have the reader unit returned to the inactive state.

8. A method of associating image data with an individual animal of plural animals, comprising:
having a first animal (A) of the plural animals enter a passageway (140), the passageway (140) including an identification zone (Z), a camera (110) being arranged to have a view field (115) that covers the identification zone (Z) in the passageway (140), the camera operatively connected to a data processor (130);
having only the first animal enter into the identification zone (Z), the identification zone (Z) being configured to only allow a single animal (A) at the time in the identification zone (Z) within the view field (115) of the camera (110);
detecting a presence of the first animal (A) within the view field (115) of the camera (110);
upon detecting the presence of the first animal (A) within the view field (115) of the camera (110), recording, via the camera (110), image data (Dimg) of the first animal within the identification zone (Z), the image data (Dimg) representing at least one specific body portion of the first animal (A), the image data (Dimg) being sent to the data processor;
the data processor using the image data (Dimg) to detect a presence of the first animal (A) within the identification zone (Z);
upon the data processor detecting the presence of the first animal (A) within the identification zone (Z) based on the received recorded image data (Dimg), generating a trigger signal (TS) that activates a reader unit (120) into an active state, wherein the reader unit (120) is normally in an inactive state and is activated into the active state only by receiving the trigger signal thereby ensuring that the reader unit (120) is in the active state exclusively when one of the plural animals is detected, from by the image data (Dimg), as being within the identification zone (Z);
upon the reader unit (120) being activated, registering, via the reader unit (120), identity data (DID) from a data carrier (150) on the first animal (A) detected within the identification zone (Z);
associating the recorded image data (Dimg) with the registered identity data (DID) of the first animal; and
maintaining the reader unit (120) in the active state during a given time interval after having generated the trigger signal (TS), and causing the given time interval to end and the reader unit returned to the inactive state when a set condition is satisfied, the set condition being at least one of:
the identity data (DID) having been registered,
a particular time having elapsed since the trigger signal (TS) was generated, and
the recorded image data (Dimg) reflecting that the first animal (A) no longer is located within the identification zone (Z).

9. The method according to claim 8, wherein the set condition is the identity data (DID) having been registered, the identity data (DID) having been registered causing the data processor to end the given time interval and have the reader unit returned to the inactive state.

10. The method according to claim 8, wherein the set condition is the particular time having elapsed since the trigger signal (TS) was generated, the particular time having elapsed since the trigger signal (TS) was generated causing the data processor to end the given time interval and have the reader unit returned to the inactive state.

11. The method according to claim 8, wherein,
the first animal is a milking animal,
the recorded image data (Dimg) represents a rear body portion of the milking animal, and
the method further comprises:
deriving a body condition score (BCS) based on the recorded image data (Dimg).

12. The method according to claim 8, wherein the set condition is the recorded image data (Dimg) reflecting that the one individual animal (A) no longer is located within the identification zone (Z), the recorded image data (Dimg) reflecting that the one individual animal (A) no longer is located within the identification zone (Z) causing the data processor to end the given time interval and have the reader unit returned to the inactive state.

13. A non-transitory processor-readable medium (135) having a program recorded thereon, wherein the program, when loaded into and executed by at least one processor (130), controls the at least one processor (130) to perform the steps:
upon a first animal (A) enters a passageway (140), the passageway (140) including an identification zone (Z), with a camera (110) arranged to have a view field (115) that covers the identification zone (Z) in the passageway (140) and operatively connected to a data processor (130), detecting a presence of the first animal (A) within the view field (115) of the camera (110) and recording, via the camera (110), image data (Dimg) of the first animal within the identification zone (Z), the image data (Dimg) representing at least one specific body portion of the first animal (A), the image data (Dimg) being sent to the data processor;
using the image data (Dimg) to detect a presence of the first animal (A) within the identification zone (Z);
detecting the presence of the first animal (A) within the identification zone (Z) using the received recorded image data (Dimg) and generating a trigger signal (TS) that activates a reader unit (120) into an active state, wherein the reader unit (120) is normally in an inactive state and is activated into the active state only by receiving the trigger signal thereby ensuring that the reader unit (120) is in the active state exclusively when one of the plural animals is detected, from by the image data (Dimg), as being within the identification zone (Z);

upon the reader unit (120) being activated, registering, via the reader unit (120), identity data (DID) from a data carrier (150) on the first animal (A) detected within the identification zone (Z);

associating the recorded image data (Dimg) with the registered identity data (DID) of the first animal; and maintaining the reader unit (120) in the active state during a given time interval after having generated the trigger signal (TS), and causing the given time interval to end and the reader unit returned to the inactive state when a set condition is satisfied, the set condition being at least one of:

the identity data (DID) has been registered, a particular time has elapsed since the trigger signal (TS) was generated, and the recorded image data (Dimg) reflects that the first animal (A) no longer is located within the identification zone (Z).

14. The non-transitory processor-readable medium according to claim 13, wherein the set condition is the identity data (DID) having been registered, the identity data (DID) having been registered causing the data processor to end the given time interval and have the reader unit returned to the inactive state.

15. The non-transitory processor-readable medium according to claim 13, wherein the set condition is the particular time having elapsed since the trigger signal (TS) was generated, the particular time having elapsed since the trigger signal (TS) was generated causing the data processor to end the given time interval and have the reader unit returned to the inactive state.

16. The non-transitory processor-readable medium according to claim 13, wherein the set condition is the recorded image data (Dimg) reflecting that the one individual animal (A) no longer is located within the identification zone (Z), the recorded image data (Dimg) reflecting that the one individual animal (A) no longer is located within the identification zone (Z) causing the data processor to end the given time interval and have the reader unit returned to the inactive state.

* * * * *